Feb. 23, 1932.  P. DE LOYE ET AL  1,846,090
SEPARATOR FOR STORAGE BATTERIES
Filed Sept. 29, 1924
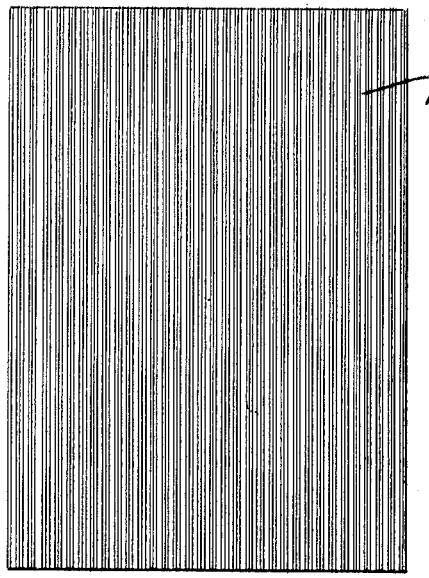
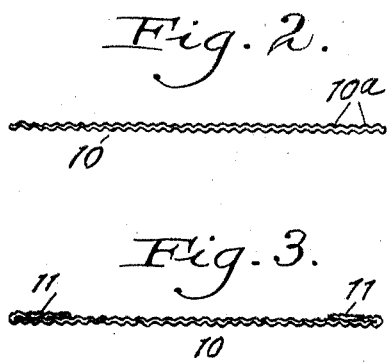
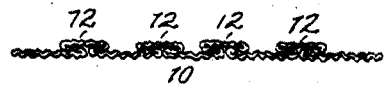
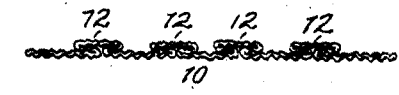
Inventors,
Paul de Loye.
André Tougot.
Thurston Kurs Hudson
attys Patented Feb. 23, 1932

1,846,090

UNITED STATES PATENT OFFICE

PAUL DE LOYE AND ANDRÉ TOUZOT, OF ST. ETIENNE, FRANCE, ASSIGNORS OF ONE-HALF TO THEODORE A. WILLARD, OF CLEVELAND, OHIO

SEPARATOR FOR STORAGE BATTERIES

Application filed September 29, 1924. Serial No. 740,628.

This invention relates to the storage battery separators formed from wood pulp and has for its main object to provide certain improvements in separators of this type which will admirably adapt them for storage battery use. More particularly the invention aims to so form the separators both as to their external physical shape or outline and as to the characteristics, relation and disposition of the pulp fibers that not only are the separators enabled to function properly and desirably from an electrical standpoint but from a mechanical standpoint they are efficient in the sense that they are durable or have long life and retain substantially their original shape, notwithstanding the fact that they are immersed in acid electrolyte and may be subjected to mechanical pressures and other stresses incident to their use in batteries, employed for various purposes.

We will describe the preferred shape of the improved separator, the preferred wood from which the pulp is derived and certain structural characteristics in so far as the fibers are concerned, all of which, we believe, are cooperative or contribute to the attainment of the desirable results, but we do not wish to be confined to the conjoint use of all these structural features, part of which may be employed advantageously without others, and we will describe the preferred method or process of forming the separators, but other methods may be found by which the same or substantially the same results can be obtained.

The invention may therefore be here briefly summarized as consisting in a separator in the form of a sheet formed from wood pulp and provided with certain structural characteristics or features and combinations of the same as will be described in the specifications and set forth in the appended claims.

In the accompanying sheet of drawings in which we have illustrated our improved separator conventionally, Fig. 1 is a face view of the separator in its preferred form shown as corrugated; Fig. 2 is an end view and Figs. 3 and 4 are similar views showing how ribs may be formed along the vertical edges and between the same in case ribs are desirable in addition to the corrugations.

Our separator consists of a sheet 10 which is firm and strong and consists of closely compacted and adhering fibers principally of cellulose. The sheet is here shown as corrugated, the corrugations 10a being formed therein not only to add stiffness to the separator but, as will be explained subsequently, the corrugations are molded in the pulp while the fibers are in a loose flocculent condition and this when produced under heavy pressure firmly compacts the fibers but primarily these corrugations are for the purpose of facilitating circulation of the electrolyte of the battery and to permit the escape of the evolved gases.

In a successful wood pulp separator it is essential that the separator be porous so as not to increase unduly the internal resistance of the battery and to permit a high voltage discharge, and what is equally important, it must have long life and be able to withstand disintegration from chemical and mechanical causes, such as from oxidation caused by the nascent oxygen evolved in the battery and from pressure produced by expansion of the active material or warping of the plates as well as from mechanical vibration to which the battery may be subjected while in use, and it must retain its form or shape so as to constantly permit the upward passage of gases. Our improved separator has all these desirable properties because of the below mentioned novel features of construction and method of producing this separator.

In the first place, the kind of wood from which the pulp is made is important. We employ a wood which has long fibers and we prefer to use spruce wood whose fibers are in the main from four to eight millimeters in length. Other woods may, however, be found suitable. The length of the fibers is an important factor in the attainment of strength in the finished separator particularly when the fibers are long in comparison with the thickness of the separator and the spacing of the corrugations. We have produced very successful separators which are approximately one millimeter in thickness and having corrugations of approximately two millimeters in width. Inasmuch as the fibers extend in all directions not only in the direction of the length of the corrugations, but also transversely of the separator and corrugation and from one corrugation to the other, it will be apparent that the use of fibers of greater length than the thickness of the separator and width of the corrugations is important to the strength and toughness of the separator. We wish it to be clearly understood, however, that the thickness of the separator may be varied, and in fact we have used different thicknesses and the spacing of the corrugations may be other than stated above.

We prefer to produce the pulp used in making our separators by the sulphite method as it gives very good results, and the cooking or digesting of the wood chips is preferably carried on as to temperature and time of digestion so as to produce strong cellulose fibers. That is to say it is desirable to remove by the treatment as little as possible of the cellulose. The wood is carefully prepared by removing all bark and imperfect portions, and sawdust and small particles are preferably screened out to reduce as much as possible the presence of short wood fibers.

After the pulp is removed from the digestor, it is not only thoroughly washed but the large and undigested particles are screened out so that the texture and porosity of the finished product will be as uniform as possible.

In producing the pulp in dried sheet form from the wet pulp, it is important in order that the separators may have the desired properties mentioned above as to strength, durability etc. that the pulp be firmly compressed to extract a large percentage of the moisture and to firmly compact the cellulose fibers before the final drying, and this is preferably done by passing the loose wet pulp between one or more pairs of corrugated rolls under very severe pressure. This molds the corrugations in the sheet and gives the fibers a permanent set particularly if the sheet is immediately after dried as by passing it over heated rolls. We find that by subjecting the pulp to a pressure between the corrugated rolls of approximately 500 pounds per centimeter length of rolls, the fibers are strongly pressed together and are apparently cemented together in the wavy or corrugated form, and we believe that the sulphite process of treating the wood chips is conducive to this result as it leaves with the cellulose fibers a small amount of the original resins and this we believe acts as cementitious or adhesive agent in holding the fibers together. The pulp is preferably heated just before being subjected to this pressure and this we believe facilitates the cementing action. Furthermore, a microscopic examination of the fibers after the pressure treatment shows them to be flattened and this we believe contributes very materially to the tenacity with which the fibers cling together as it increases the surface contact between them.

After the compressed corrugated sheet is dried, it is cut into sheets of convenient size for handling and from these sheets separators of any desired size and shape are cut. These separators may be used in batteries without further treatment, but if the desired acid space between the plates require it, the separators may be ribbed along the upright margins by folding over the side edges as illustrated at 11 in Fig. 3, and by a folding process ribs may be formed between the edges as illustrated at 12 in Fig. 4. Or they may be used double or face to face in two thicknesses and in the latter case by having the corrugations of the two separators at a slight angle to each other the corrugations will not mesh and an acid space is thus provided between the separators. In this case the separators engage both the positive and negative plates and hold the active material in place.

Storage battery separators formed as above described have good porosity and permit high voltage discharge. In this respect and also in life and durability they are better than the commonly employed wood separators. They do not, however, permit the passage therethrough of active material and they effectively separate or insulate the plates from each other notwithstanding swelling or bulging of the active material, these separators being able to resist the pressure incident thereto without breakage or puncturing. Additionally, as already pointed out, these separators retain their corrugated form even though saturated with electrolyte and under the pressures to which they are subjected between the plates of batteries as the latter are charged and discharged in ordinary and even extraordinary use. In consequence, the passageways formed by the corrugations avoid the formation of gas pockets between the plates and separators in identically the same way as though the separators were formed from solid material.

The separators are not adversely affected by the nascent evolved gases to any greater extent than separators commonly employed, but we may if desired surface the tops of the ribs formed by the corrugation with a suitable protective substance such as bakelite. This treatment while not essential will, we believe, increase the life of the separator and since the bakelite will penetrate the pores somewhat the separator will be rendered somewhat firmer. If desired, the vertical and horizontal marginal edge portions may be thus treated to form a protective border for the pulp.

In conclusion, it might be mentioned that our improved wood pulp separators are considerably cheaper than ordinary wood separators, and in addition to the advantages over wood separators mentioned above they can be preserved in a dry state indefinitely and employed in the so called charged bone dry batteries, and their porosity is such that they can be used in small special batteries which are desirably employed without excess electrolyte over that absorbed and retained by the separators. In such case the battery will have high capacity on discharge when fitted with our separators.

Having thus described our invention what we claim as new and desire to secure by Letters Patent is:—

1. A storage battery separator consisting of a dense corrugated sheet of wood pulp having interlaced and compacted fibers longer than the width of a single corrugation some of which fibers at least extend transverse to said corrugations.

2. A storage battery separator formed from wood pulp whose fibers are interlaced and compacted into a dense corrugated sheet so as to cause them to adhere one to another and in the main are of such length relative to a distance between corrugations that part of them extend from one corrugation to another whereby the separator tends to retain its corrugated form under working conditions.

In testimony whereof, we hereunto affix our signatures.

PAUL DE LOYE.
ANDRÉ TOUZOT.